United States Patent
Murray et al.

(10) Patent No.: US 11,842,623 B1
(45) Date of Patent: Dec. 12, 2023

(54) CONTEXTUAL CALIBRATION OF CONNECTED SECURITY DEVICE

(71) Applicant: FORD GLOBAL TECHNOLOGIES, LLC, Dearborn, MI (US)

(72) Inventors: James Nicholas Murray, Chelmsford (GB); Tarik Safir, Derbyshire (GB); Sam Harris, Billericay (GB); Hasan Akoglu, Brentwood (GB); Julian Aaron Abentheuer, London (GB); Gabriel Mitchell, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/746,053

(22) Filed: May 17, 2022

(51) Int. Cl.
G08B 29/24 (2006.01)
G08B 29/18 (2006.01)

(52) U.S. Cl.
CPC ............ *G08B 29/24* (2013.01); *G08B 29/185* (2013.01)

(58) Field of Classification Search
CPC ................................ G08B 29/24; G08B 29/185
See application file for complete search history.

(56) References Cited

U.S. PATENT DOCUMENTS

| | | | |
|---|---|---|---|
| 7,705,724 B2* | 4/2010 | Cochran | G01W 1/04 340/517 |
| 9,576,469 B2* | 2/2017 | Modi | G08B 29/185 |
| 10,202,103 B2 | 2/2019 | Munafo et al. | |
| 10,286,842 B2* | 5/2019 | Penilla | G06Q 30/00 |
| 10,930,140 B1* | 2/2021 | Stone | G08B 29/16 |
| 11,232,688 B1* | 1/2022 | Lemberger | H04N 7/18 |
| 2015/0061859 A1* | 3/2015 | Matsuoka | G08B 25/008 340/501 |
| 2016/0049071 A1* | 2/2016 | Beaver | G08B 29/185 340/514 |
| 2022/0277644 A1* | 9/2022 | Hagström | G08B 29/185 |

FOREIGN PATENT DOCUMENTS

| | | |
|---|---|---|
| CN | 110969792 A | 4/2020 |
| WO | 2019233330 A1 | 12/2019 |
| WO | 2020088739 A1 | 5/2020 |

* cited by examiner

*Primary Examiner* — John A Tweel, Jr.
(74) *Attorney, Agent, or Firm* — Joseph Zane; Brooks Kushman P.C.

(57) ABSTRACT

A vehicle includes determines that a vehicle alarm system has been engaged and determines a local context applicable to the vehicle alarm system. The vehicle obtains an alarm system configuration mapping applicable in light of the local context. The vehicle changes sensitivity of one or more sensors associated with the alarm system based on the configuration mapping.

19 Claims, 4 Drawing Sheets

CONTEXTUAL CALIBRATION OF CONNECTED SECURITY DEVICE

TECHNICAL FIELD

The illustrative embodiments generally relate to contextual calibration of a connected security device or sensor.

BACKGROUND

Security devices and vehicle sensors, such as cameras, tend to be statically calibrated in a given vehicle. That is, regardless of the environment, time of day, or aftermarket additions to the vehicle, the security device or sensor tends to operate under the same parameters. The effects of this can be seen, for example, if localized construction in a parking garage continually triggers vehicle alarms because of vibration, or thunder causing triggering of vehicle alarms for similar reasons.

While incidental triggering of a vehicle alarm may not be a noise nuisance in a business parking lot, it does tend to desensitize people to the alarm sounds, such that many people, including a vehicle owner, may not bother to take notice of an alarm when the alarms become too commonplace. In a quieter environment, such as a neighborhood, the preceding effect may also occur, and, moreover, neighbors may be irritated at an alarm that is highly sensitive and is continually triggered by false positive events.

At the same time, down-tuning the sensitivity of alarms or other sensors to mitigate such issues may have an undesirable effect of leaving the vehicle vulnerable when such sensitivity is needed. Similarly, vehicle sensors of other natures (such as cameras) may not adapt to a change in a vehicle body, or may be built with a "stock" configuration, so that, for example, a truck-bed camera may not actually view the whole bed when a bed is extended, or may not be able to view an area over an after-market plow upfitter addition. This can either create a number of false positives (e.g., the camera reads the plow as an object worthy of an alert) or create dead-zones in which sensing functions improperly.

SUMMARY

In a first illustrative embodiment, a vehicle includes one or more processors configured to determine that a vehicle alarm system has been engaged. The one or more processors are also configured to determine a local context applicable to the vehicle alarm system and obtain an alarm system configuration mapping applicable in light of the local context. Further, the one or more processors are configured to change sensitivity of one or more sensors associated with the alarm system based on the configuration mapping.

In a second illustrative embodiment, a method includes determining that a vehicle alarm system has been engaged and determining a local context applicable to the vehicle alarm system based on reporting a vehicle location to a remote server and receiving at least an aspect of the context back from the remote server. The method also includes obtaining an alarm system configuration mapping applicable in light of the local context and changing sensitivity of one or more sensors associated with the alarm system based on the configuration mapping.

In a third illustrative embodiment, a non-transitory computer-readable storage medium storing instruction that, when executed, cause one or more processors of a vehicle to perform a method comprising determining that a vehicle alarm system has been engaged and determining a local context applicable to the vehicle alarm system. The method also includes obtaining an alarm system configuration mapping applicable in light of the local context and changing sensitivity of one or more sensors associated with the alarm system based on the configuration mapping.

DETAILED DESCRIPTION

Figure 1:
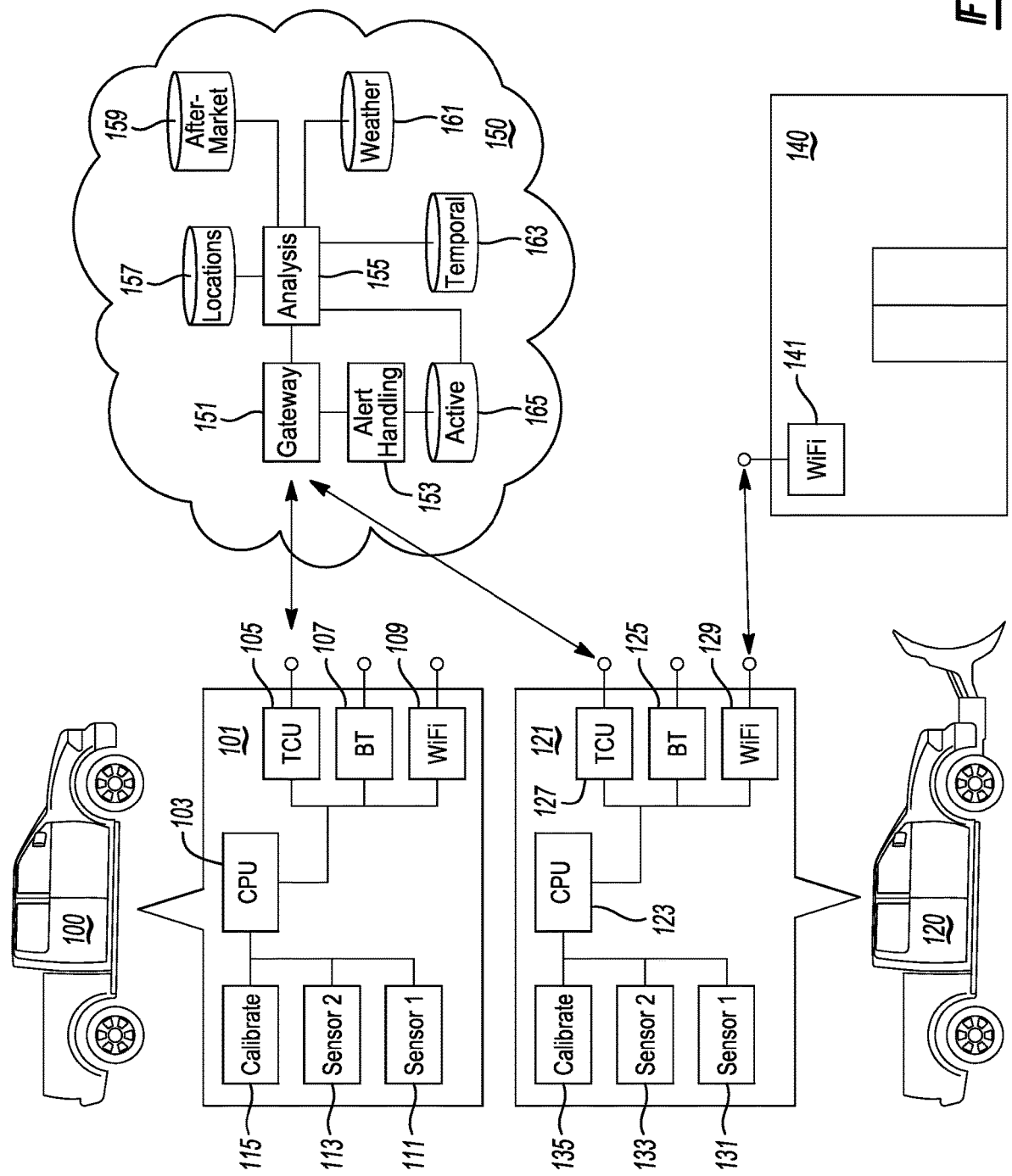
FIG. 1 shows an illustrative adaptive multi-vehicle sensing and alert system with communication.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While vehicles are provided with very complex sensing capabilities, and those sensing capabilities can be leveraged to provide, among other things, enhanced vehicle security, the sensing systems tend to be static in configuration. Alternatively, even if not static, the sensing may have, for example, gradient sensitivity (e.g., high/low) wherein the user must decide which level to employ at any given moment or otherwise result to whatever is set for a default. This can lead to a system with many false positives or too few detections.

In order to diminish bothering neighbors, users may be inclined to set a system to a low sensitivity, if such a setting is even possible. In other areas, original equipment manufacturers (OEMs) or system providers may be required by noise-related laws to tune certain equipment to a certain level. Even without any prohibition, too many false positives will result in a world where everyone tends to simply ignore vehicle alerts until they cease.

Similarly, the systems may be designed to provide coverage for a stock model and may not accommodate body changes, aftermarket addons or upfits, etc. So, for example, a camera may provide two zones of coverage, one highly sensitive that covers a stock vehicle truck bed, and a less sensitive zone that accommodates an area around the bed. The truck bed zone may trigger upon any detection, the surrounding zone may trigger based on a persistence of presence, to prevent triggering based on passers-by or animals. If the vehicle bed was extended by several feet, the second zone would encompass the new portion of the bed, instead of the area behind it. This could result in a less secure bed portion (where a thief would have to linger) as well as a portion behind the bed where there was not a full zone of coverage.

In another example, a front-zone system may cover an area in front of the vehicle and trigger based on persistence of presence. If a plow were added to the vehicle, it could block a portion of the camera and further, as an ever-persistent object, trigger alerts based on its existence.

In still another example, a vehicle may have a large load that extends past a bed-end, and the user may want the high sensitivity zone to extend to the end of the load. This extension could be automatically triggered based on a lowered vehicle ingress retention unit or seemingly persistent obstruction in the bed, or the user could configure a zone based on an in-vehicle display of the camera coverage area, for example, by using a stylus or finger to draw a perimeter around a load or designate load-elements for high-security watch.

Down-tuning sensitivity of sensors and/or expanding zones in a one-time reactive sense can create persistent new problems. Instead, the illustrative embodiments propose adaptive and/or reactive calibration of sensors based on context, both vehicle and external centric. Changes to a vehicle body, weather, local noise and foot traffic, local statistical analysis of threats and even triggering of proximate sensors can all serve as predicates for a recalibration event, so that vehicle security systems and sensors can be tuned to the instance at hand, with diminished fear of creating a new problem by accommodating an existing one.

FIG. 1 shows an illustrative adaptive multi-vehicle sensing and alert system with communication. In this example, two vehicles 100 and 120 have a similar base configuration, but 120 has a longer bed and an aftermarket upfit plow attachment (shown in greater detail in FIGS. 2A-2C). The hardware provided to the vehicles at build may be the same, so that both vehicles have the same sensors and security systems provided thereto, mounted at comparable locations relative to each other.

Each vehicle 100, 120 includes a vehicle computing system 101, 121, with one or more onboard controllers and/or CPUs 103, 123, as well as communications transceiver such as, but not limited to, telematics control units (TCUs) 105, 127, BLUETOOTH transceivers 107, 125, Wi-Fi transceivers 109, 129, etc. While any vehicle 100, 120 can be provided with different or specialized hardware, in a mass production sense it is likely that many vehicle base chassis will be provided with the same equipment and mountings and decisions like bed-length and upfittings will be decided by customer specification well after the fact of hardware installation and configuration.

Each vehicle 100, 120 includes a plurality of sensors 111, 113, 121, 123 and a calibration process 115, 135. The calibration can be done largely in the vehicle, largely in the cloud or in a combination of action between the two. The cloud 150 may calculate the necessary adjustments and send calibration zones to the vehicle 100, 120, but there may still be onboard software to implement the designated calibrations. In other examples, a fixed set of calibrations may be stored onboard the vehicle and the vehicle may self-determine context (rendering the whole process onboard) or receive context from the cloud that designates or aids in determining an applicable calibration.

The TCUs 105, 125 and/or the Wi-Fi transceivers 109, 129 can communicate with the cloud 150 via one or more communications gateways 151 for request handling and communication serving. The cloud may include an alert-handling process 153 to provide distributed alert notification.

For example, if building 140 were robbed, a local Wi-Fi transceiver 141 may communicate an alarm to surrounding vehicles 120, which can go on high-alert themselves as well as provide active camera data gathering. The cloud 150 can extend the range of the signals to a larger group of vehicles 100 in the locality as well as provide enhanced data aggregation and analysis (e.g., vectoring of possible suspects, speed of suspects, areas of last detection, etc., based on camera aggregation and analysis). Active alerts may be stored in an alert database 165, for distribution to vehicles newly entering an alert zone (e.g., parking near a store that was just robbed or a vehicle that was just broken into).

A context analysis process 155 may analyze the context of a given location of a vehicle 100, 120 and provide a responsive context or threat level for dynamic sensor and security calibration. This can include access to locations in a database 157, along with threat characteristics of those locations, which can include variances based on time of day, day of week, holiday, parking level (e.g., lower or higher levels may have varied characteristics relative to ground levels of a garage), etc. Another database 159 can provide aftermarket calibrations that accommodate approved upfits and aftermarket additions, so that mounted fixtures can be accounted for and adjusted for. Weather database 161 can include both local weather systems and reactions to those systems—e.g., threat calibration based on systems. "Threat" in some contexts may not actually mean the vehicle is threatened, but may create a calibration based on the likelihood of a security event as well. For example, a thunderstorm may be characterized as a low-threat event in that it may be desirable to downgrade sensitivity of vibration sensing during the storm to skip false positives. This can be weighed against the threat of a locality (e.g., questionable neighborhood) in which a vehicle is parked. The neighborhood may override in some instances, but for others parked in a less questionable locality, the sensitivity may be calibrated downwards until the storm passes.

A temporal database 163 may store time of day, day of week, holiday, etc. related parameters, indicating general and specific likelihoods of issues on certain days, during certain hours, on certain holidays, etc. This can be stored on a geographic basis as well, e.g., New Years Eve may be a high threat holiday in one city, but may represent zero change in threat in a rural locality.

Using this and other contextual data, as appropriate, security systems and sensors can be tuned for the situation at-hand, on an on-demand or near on-demand basis. Users may also be able to configure thresholds so that down-tuning or up-tuning past certain levels is prohibited by user controls. Users can also override context data if desired, so that the user can define the applicable threat for a given context, instead of relying on gathered data, which may be particularly useful for areas that have limited data gathered thereon.

Figure 2A:
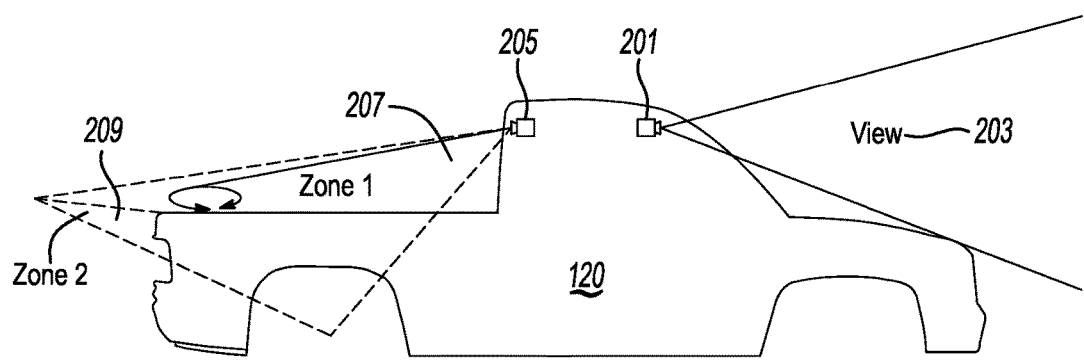
FIGS. 2A-2C show illustrative examples of retuned sensor zones.
Figure 2B:
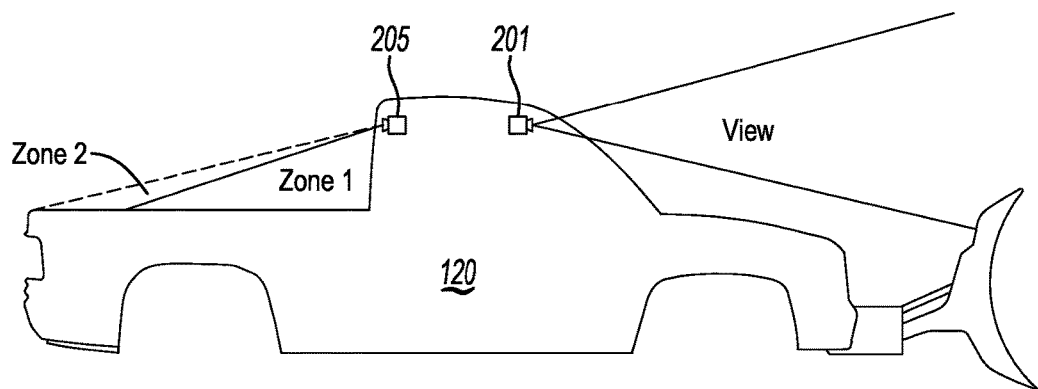
Figure 2C:
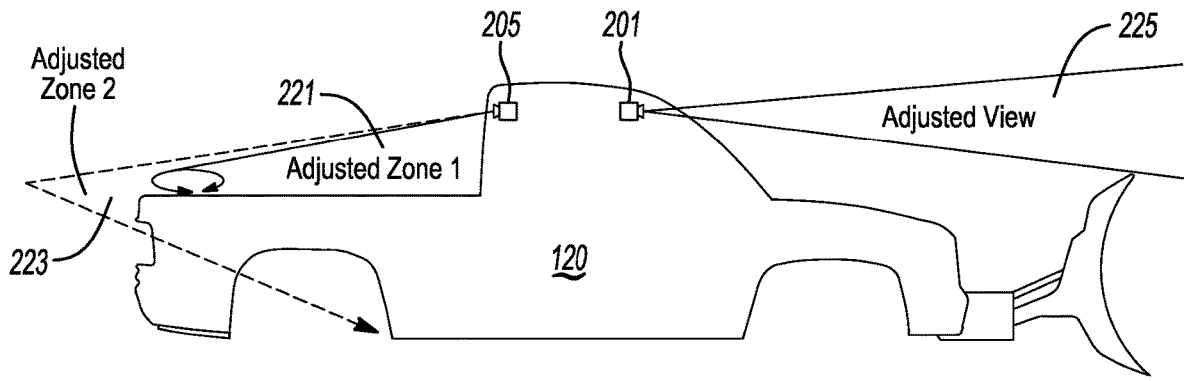

FIGS. 2A-2C show illustrative examples of retuned sensor zones. FIG. 2A shows a base model of a vehicle 120 that may include a "standard" length bed and no aftermarket additions or upfits. The vehicle 120 has a rear camera 205 (or radar, lidar, etc.) covering two zones 207 and 209. The zone 207 is a bed zone, which may be more highly sensitive and may generally be defined by the dimensions of a conventional vehicle bed for this vehicle model. The camera may, for example, register any motion entering or exiting this zone on a single-frame detection basis, so that an alert can be issued if anything breaches the perimeter of the bed. Zone 209 may be a wider detection zone more generally applicable to vehicle protection, which can detect, for example, X frames of persistence of an object (e.g., if an object persists in a location for 12 frames, it may be someone with malicious intent). This less sensitive zone may accommodate animals, local vehicles and passers-by without triggering false positives.

In a high-threat area, an owner, especially of a valuable vehicle or with valuable cargo, may want a lower trigger threshold set for the outer zone 209. It is worth noting that the zone may not always trigger a vehicle alert, but may sometimes result in a direct message to an owner, so that a higher sensitivity may not always result in an alarm. That said, the sensitivity for a notification event and alarm event may both be tunable and may both be increased or decreased if desired.

A front camera 201 has a view 203 as well, which can include a viewpoint to show a driver (e.g., in-vehicle display) and/or a sensor zone usable for security purposes. When the vehicle is outfitted with a longer bed and plow, as in FIG. 2B, the original zones are not adequate to address the changes in the vehicle body. Zone 1 207 does not fully cover the bed, leaving a portion of the bed in Zone 2 and not subject to the high-sensitivity alert. Zone 2 does cover the rest of the bed, but may not extend behind the vehicle as far, because of the lengthened bed. The camera view 203 is partially obstructed by the upfitted plow attachment.

When the sensors and security can dynamically recalibrate, to accommodate the bed and/or plow, the system can achieve the coverage of FIG. 2A in terms of completeness, as shown in FIG. 2C. The recalibrated zone 1 221 covers the bed as intended, and the recalibrated zone 2 223 covers the extended areas beyond the bed with the intended coverage. The camera does not need to be changed to a different camera, and so the notion of building a vehicle with a base camera model and mounting point does not need to change to accommodate varied vehicle configurations. Similarly, in the front of the vehicle, the camera has adjusted the field of view that it considers to field 225, which clears the plow (and can accommodate and "up" or "down" plow configuration, if needed, by adapting responsive to signals indicating plow deployment). Any sensing occurring in the field now does not react to the presence of the plow blade, as the area of contemplation excludes the blade.

Figures 3, 4:
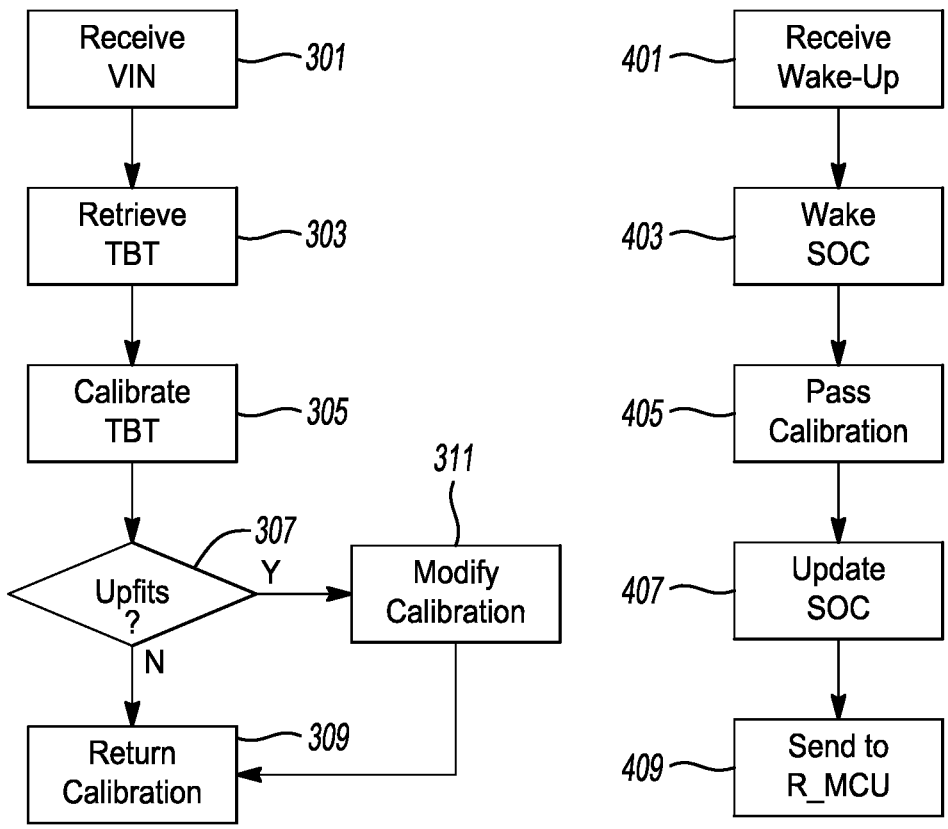
FIG. 3 shows an illustrative example of a configuration process based on a vehicle build.
FIG. 4 shows an illustrative example of an onboard calibration process.

FIG. 3 shows an illustrative example of a configuration process based on a vehicle build. This is a base calibration that can occur based on vehicular context, i.e., how a given varies from a "stock" model. The process, which can execute in the cloud, for example, receives a vehicle identification number (VIN) at 301 and retrieves a truck bed type (TBT) or other variance that might require recalibration at 303, associated with the VIN. If the change is one that is provided by the OEM, there should be a finite number of scenarios of dimensional change, and so all can be accommodated by pre-planning if needed, such that there is a "base" recalibration stored for each body-variance and the VIN will allow for identification of the applicable recalibration. The process can determine (or lookup) the appropriate calibration for the TBT and any other body variances that can affect sensor fields at 305.

In this example, the user can also identify, or the OEM may have record of, additional upfits to the vehicle at 307. There may not be a stock recalibration for every possible upfit, but there may be a number of stock recalibrations for certain common or approved upfits. It may also be possible to generally or specifically recalibrate for a known upfit or an upfit that changes vehicle dimensions in a certain manner, if those dimensions can be provided (when not already known by the OEM). If there is an upfit at 307 (and if recalibration is possible based on data about the upfit or knowledge about the upfit), the process may modify the TBT calibration at 311 and then returns the adapted recalibration at 309 for application by the vehicle 120.

A similar process could occur onboard the vehicle 120, if the vehicle 120 stored a list of base recalibrations and then could lookup its own recalibration onboard, based on TBT or other modification. Cloud assistance may be useful in such an instance, at least for upfits, since those may be more likely to vary with time in shape and design and because the OEM has less control over the ultimate form the upfits take, since upfits are often aftermarket additions sold by third parties. As such, the OEM cloud may have a better record of preapproved and vetted recalibrations and/or data about the specifications of a given upfit module usable to dynamically calculate a recalibration. Nonetheless, there are aspects of recalibration that can be done onboard, up to and including calculating recalibration dynamically, if the vehicle 120 has sufficient information to complete the calculation.

FIG. 4 shows an illustrative example of an onboard calibration process using information from the cloud. In this example, the cloud may have received a message with the vehicle VIN, and may request a wakeup of the vehicle computer. The cloud may have already retrieved the associated TBT or other modification and mapped a calibration to the vehicle identified by the VIN.

The vehicle computer receives a wakeup request, e.g., via cellular communication, from the cloud at 401 and wakes up the system on chip (SoC) at 403. The SoC receives the calibration from the cloud at 405 and updates a calibration file at 407 that can be passed to the R_MCU upon cold boot. The file is used to configure the target detection area (TDA) or any other calibratable aspect as needed.

In this example, the recalibration may occur with cloud assistance after any over the air update, where the SoC retrieves the TBT and calibration from the cloud. In the alternative example, wherein the SoC simply obtains the TBT type, the SoC may have a saved JSON with TBT-calibrations, so that knowing the TBT (or other modified vehicle aspect) the SoC can lookup the relevant calibration without cloud assistance. The SoC may still pass the calibration to the radar microcontroller unit (R_MCU) after cold boot, but may not need to otherwise contact the cloud.

Figure 5B:
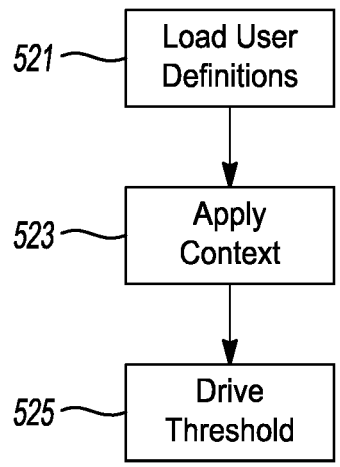
FIG. 5B shows an illustrative example of user-configured threshold contemplation.
Figure 5A:
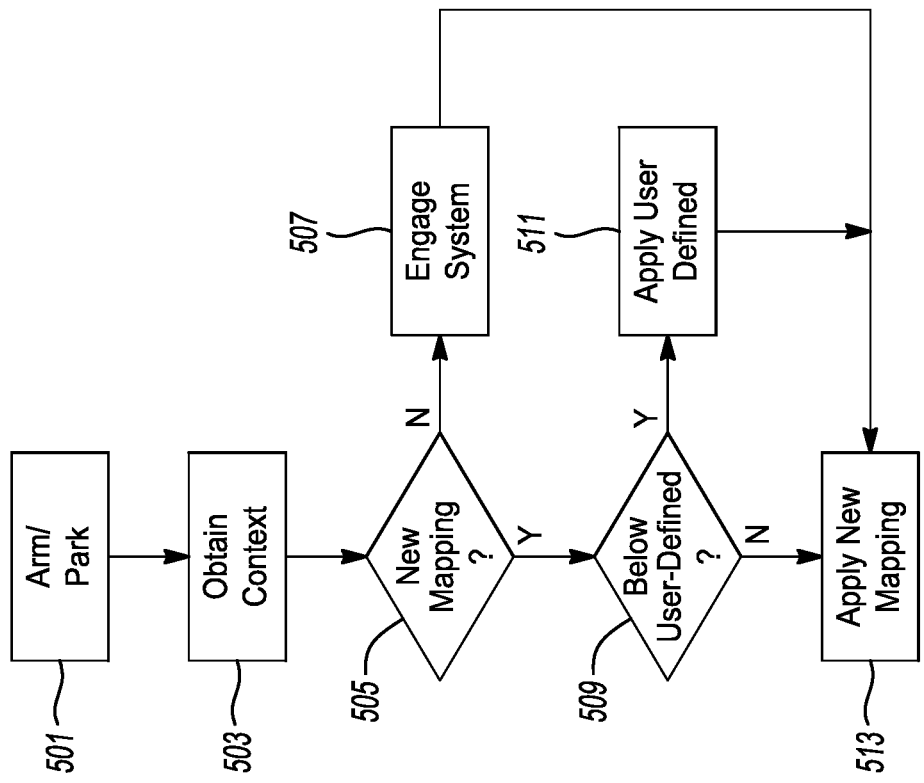
FIG. 5A shows an illustrative example of a context-adaptive calibration process.

FIG. 5A shows an illustrative example of a context-adaptive calibration process. This is a type of calibration of, for example, alarm sensitivity that may be context adaptive. As explained in example below, a given user may want a wide variety of alarm settings under different contexts, which can include both sensitivities and calibrations of target zones.

For example, the process may detect that the vehicle 120 is parked and/or the system is armed at 501. In response, the process obtains a context that may apply at 503. The context can include many different aspects such as, but not limited to, vehicle location, time/date/day of week, nearby alarms, user preferences, weather, etc.

The contexts may be used in conjunction and/or individually to determine threat levels or threshold alarm settings related to a given context. For example, location alone may designate a threat level based on a historical analysis of crime in a given area. That analysis may also change based on, for example, day of week, time of day, type of weather, etc. The degree of granularity of correlation can be a matter of choice for the user or provider. In some instances, the mere fact that a vehicle is parked in an area that occasionally experiences high crime (e.g., at nights on weekends) may be sufficient to designated a high threat and a low sensitivity threshold for alarms and/or an expanded TDA. In other instances, the user or provider may want a more granular correlation to skip excessive false positives, so that in the preceding instance, the high threat calibration would apply when the vehicle was parked in that area on a night during a weekend.

Similarly, it may be a general case that vehicles are more subject to crime at night, for example, than during the day. That fact alone may justify a high threat setting at night, or the user or provider may want to also correlate the high threat to specific areas or days of the week/year that experience more threats at night specifically. Or, a user may want a high threshold (low likelihood of trigger) at night when parked at home, to diminish bothering neighbors with false positives, and so the location and time of day may both be relevant for that tuning as well.

Days of the year may reveal dates that have historically high incidences of crime, such as New Year's Eve. Settings may be tuned to high threat levels on such days, or, again, the correlation of other context may also be utilized.

Triggering of nearby devices may also cause a device to go on high alert, as the nearby triggering may be indicative of an immediate threat. Someone may be attempting to break into vehicles along a street, for example, or a local business may have been robbed and the culprit may be seeking an escape or hiding place.

Whether considered together or individually, contexts may be used to set threat levels based on, for example, the highest threat level associated with an applicable context. That is, the day of year may have a low threat, but the locality may have a high threat, so the locality may control. This allows for addressing at least one aspect of threat, and still tuning down a system when there is no particular threat based on any considered context. User settings may also override, since a user may be in a better position to gauge actual threat in their locality, and further may want certain sensitivities disabled because of personal reasons.

Once the applicable contexts have been obtained, which can be done locally through onboard systems such as clocks and sensors, and remotely by obtaining data from the cloud about weather or other less observable contexts, the system can decide if a new mapping should apply at 505. That is, should the system be tuned upwards (more sensitive) or downwards (less sensitive) from current sensitivity levels. Sensitivity tuning generally just refers to the likelihood of a triggered alarm and does not necessarily have to relate to the actual sensitivity of a given aspect of the alarm. It can include, but is not limited to, vibration sensitivity, persistence of object tracking, speed of object tracking, path of object tracking, etc. If a state trigger for an alarm can be set to different values, then it can relate to sensitivity. This can also include an increase or a reduction of a TDA around the vehicle or a sensor.

If there is not a new mapping, the process may engage the alarm system with the base or prior configuration at 507. If there is a new mapping at 505, the process may consider whether the mapping exceeds a user threshold. User thresholds may define both preferred threat level settings and sensitivity thresholds. For example, a user may always want a high sensitivity when away from home and always want a low sensitivity when at home. In this instance, the user preference may control the context determination, regardless of what the actual context dictates.

If the new context is below (or above) the user threshold at 509, i.e., if the user threshold is set to designated control and dictates an alternative setting, the user threshold is applied at 511. Otherwise, the context designated calibration applies at 513. In some instances, the user may defer to context—e.g., the user may designate a specific sensitivity at home, but may defer to context when away from home, having less familiarity with other areas and contexts. The user may still have a user defined base preference, but may allow context to control when applicable.

FIG. 5B shows an illustrative example of user-configured threshold contemplation. In this example, the process loads user definitions of context at 521, which can be those such as the preceding examples. The user may define a plurality of preferred contexts and applicable threat levels, as well as defining when the vehicle should apply the context based control vs. the user defined control.

For example, without limitation, user A may have once had a vehicle stolen on NYE, so may be always sensitive to that day, and may therefore define a controlling high threat level for NYE, exclusive of location, weather, etc, to drive the threshold at 525 for threat detection based on the applied context. The user may also define a controlling low threat level for being located at home, for all days except NYE. For other locations, the user may define a non-controlling base medium threat level, but allow context to control as dictated by the analysis of context in the cloud or onboard the vehicle. This allows the system to be adaptive to context while still accommodating the wishes of the user.

Another context, as noted, may be localized immediate threats. This may automatically trigger a high threat level, which may or may not be subject to user override. Local authorities may use the vehicle to track threats and may request or require an expanded TDA when a local threat is triggered, as a theft or further-crime deterrent. Users may alternatively opt-in to an assistance program which automatically promotes the threat level to high upon localized crime, giving momentary controlling setting privileges to the occurrence of local crime.

Figure 6:
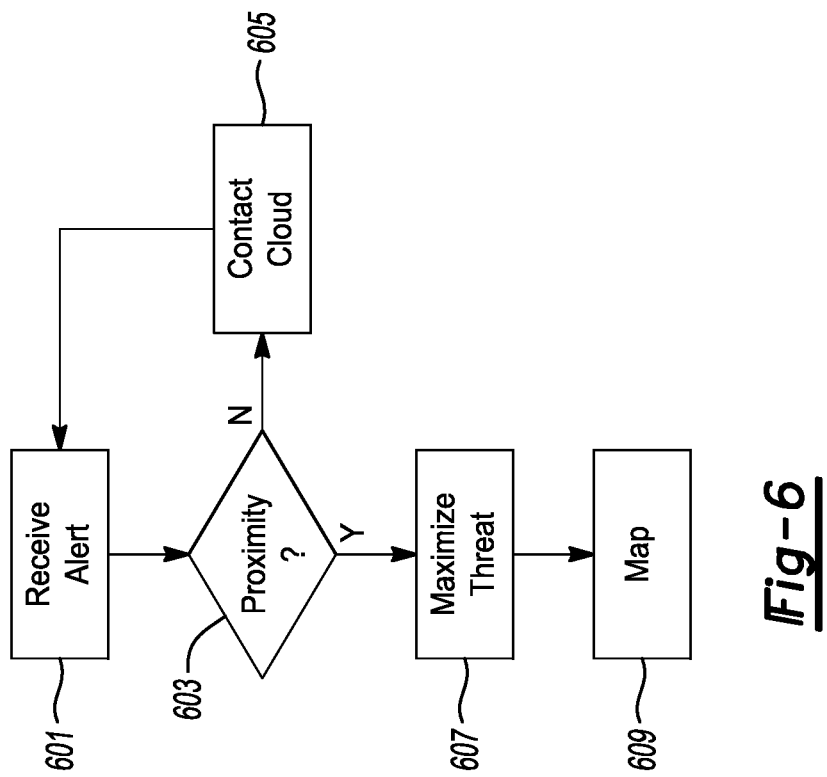
FIG. 6 shows an illustrative process for adaptive alert response.

FIG. 6 shows an illustrative process for adaptive alert response in response to local alerts. The notification of alert can come from a nearby vehicle triggered alarm, via BLUETOOTH, for example, or can come from a local business triggered alarm, via Wi-Fi (any suitable communication medium could be used for either).

The vehicle can receive an alert notifying the vehicle of a localized threat at 601. This is a notification of, for example, an immediate security-level event, which could make it possible that the vehicle itself (being in proximity to the event) could be threatened, or maybe the vehicle will be used to assist in detection of a criminal. When the threat notification is received, the process determines if the vehicle is in immediate proximity to the threat at 603. This may not be entirely clear from the signal received, and so the vehicle may have to contact the cloud at 605 to obtain more details on the threat. In other instances, authorities may request vehicle assistance in threat determination, and so may broadcast an event over a wider area, but the vehicle itself may only enter high threat phase if the vehicle receives a more direct indication from the cloud that that threat is immediately proximate. For example, a theft could occur at a local store, and the authorities could put vehicles within 2 miles on alert. This could be thousands of vehicles, and so threat-tracking vectors may be used to determine which vehicles should be put on actual alert—i.e., as the thief is detected moving in a certain direction, projected movement vectors can be used to activate certain vehicles.

When the threat is in a predefined proximity to the vehicle (which may vary based on the nature of the threat and environment), the process may switch to a maximum threat configuration at 607, which uses expanded sensor zones and sets threat sensitivity to high. The vehicle then can apply an appropriate calibration mapping, which can be a maximal mapping at 609 (all sensors set to maximum) or maximizing certain sensors based on what the real threat is expected to be or represents.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
one or more processors configured to:
determine that a vehicle alarm system has been armed;
responsive to the arming, determine a local context applicable to the vehicle alarm system;
obtain an alarm system configuration mapping, predefined for a plurality of contexts, applicable in light of the local context; and
change sensitivity of one or more sensors associated with the alarm system based on the configuration mapping, wherein the local context includes a plurality of factors and at least two of the factors have conflicting sensitivity changes associated therewith, and, in response to the conflicting sensitivity changes, the one or more processors are configured to change the sensitivity based on the more-sensitive change to increase threat detection based on the change.

2. The system of claim 1, wherein the local context includes a crime level associated with a locality where the vehicle is parked.

3. The system of claim 1, wherein the local context includes a time of day.

4. The system of claim 1, wherein the local context includes a date.

5. The system of claim 1, wherein the local context includes weather at a location where the vehicle is parked.

6. The system of claim 1, wherein the change to sensitivity includes expanding or decreasing a sensor detection zone to change a detection area.

7. The system of claim 1, wherein the change to sensitivity includes changing reaction to a characteristic of an object within a sensor zone.

8. The system of claim 7, wherein the characteristics include at least one of persistence of object, speed of object or path of object.

9. The system of claim 1, wherein the change in sensitivity includes changing vibration sensitivity.

10. A method comprising:
- determining that a vehicle alarm system has been engaged;
- determining a local context applicable to the vehicle alarm system based on reporting a vehicle location to a remote server and receiving at least an aspect of the context back from the remote server;
- obtaining an alarm system configuration mapping applicable in light of the local context; and
- changing sensitivity of one or more sensors associated with the alarm system based on the configuration mapping.

11. The method of claim 10, wherein the local context includes a crime level associated with a locality where the vehicle is parked.

12. The method of claim 10, wherein the local context includes a time of day.

13. The method of claim 10, wherein the local context includes a date.

14. The method of claim 10, wherein the local context includes weather at a location where the vehicle is parked.

15. The method of claim 10, wherein the change to sensitivity includes expanding or decreasing a sensor detection zone to change a detection area.

16. The method of claim 10, wherein the change to sensitivity includes changing reaction to a characteristic of an object within a sensor zone.

17. The method of claim 16, wherein the characteristics include at least one of persistence of object, speed of object or path of object.

18. The method of claim 10, wherein the change in sensitivity includes changing vibration sensitivity.

19. A non-transitory computer-readable storage medium storing instruction that, when executed, cause one or more processors of a vehicle to perform a method comprising:
- determining that an alarm system of a vehicle has been armed;
- responsive to the arming, determining a local context applicable to the vehicle alarm system based at least in part on a sensor of the vehicle and based at least in part on reporting a location of the vehicle to a remote server and responsively receiving at least one aspect of the local context from the remote server;
- obtaining an alarm system configuration mapping applicable in light of the local context; and
- changing sensitivity of one or more sensors associated with the alarm system based on the configuration mapping.

* * * * *